J. BLACKIE.
Rope Machine.
No. 51,915. Patented Jan. 9, 1866.
Fig. 1.
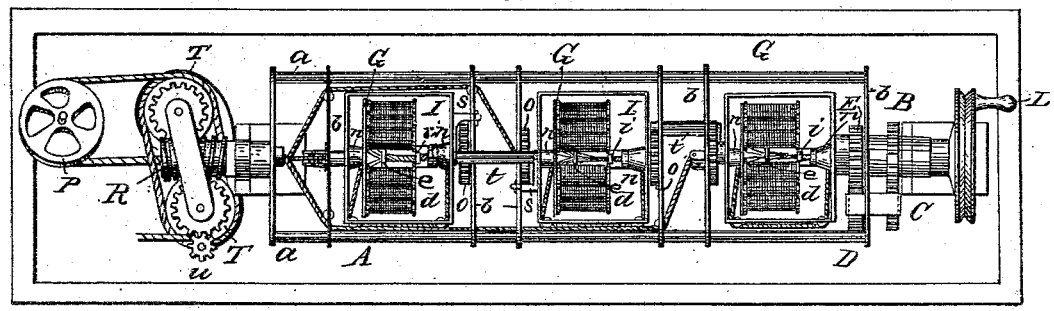
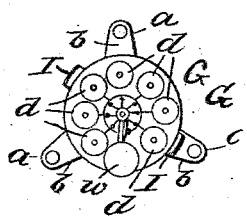
Fig. 2.
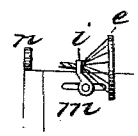
Fig. 3.
Fig. 4.
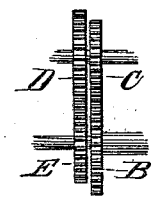
Fig. 6.
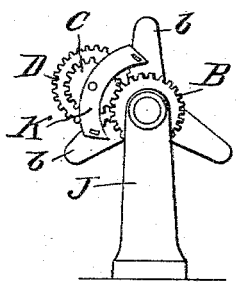
Fig. 5.
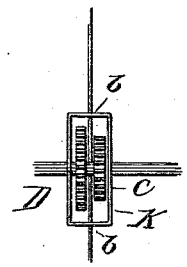
Witnesses:
P. T. Dodge
Thomas J. Gardner
Inventor:
John Blackie
By M. Dodge
Attorney

UNITED STATES PATENT OFFICE.

JOHN BLACKIE, OF NEW YORK, N. Y.

IMPROVEMENT IN ROPE-MACHINES.

Specification forming part of Letters Patent No. 51,915, dated January 9, 1866.

*To all whom it may concern:*

Be it known that I, JOHN BLACKIE, of New York, in the county and State of New York, have invented certain new and useful Improvements in Machines for Making Rope; and I hereby declare that the following is a full, clear, and exact description thereof, reference being had to the accompanying drawings, and to the letters of reference marked thereon, making part of this specification, in which—

Figure 1 is a top-plan view of the machine ready for operation, and Figs. 2, 3, 4, 5 and 6 are views of the details shown separately, as hereinafter described.

The nature of my invention consists in constructing and mounting a main frame to revolve in one direction, with a series of inside frames revolving in an opposite direction, with reels or bobbin-holders arranged inside of the latter, and so arranging these parts, together with the actuating mechanism, that when properly supplied with yarn and set in motion a rope is formed complete at one operation direct from the yarn.

To enable those skilled in the art to construct and use my improved machine, I will proceed to describe it.

A represents the main frame, which consists of three longitudinal bars or rods, $a$, held together by a series of cross-frames having three radial arms, $b$, attached to a central disk or hub, as shown in Figs. 1, 2 and 6, there being several of the cross-frames, as shown in Fig. 1, for the double purpose of holding the rods $a$ rigid and forming a support for the other parts of the machine, as hereinafter explained. The main frame A, thus constructed, is mounted on journals at each end in proper supports or bearings, and within it is mounted a series (in this case three) of smaller frames, I, consisting of two parallel bars extending longitudinally, and connected at their ends by cross-bars, as shown in Fig. 1. To the cross-bars of these smaller frames I, at each end of the frame, is secured a hollow journal, $n$, upon which the frame I is mounted in the cross-pieces of the main frame, so as to revolve therein. Upon the inner end of these hollow journals $n$, which project inside of the cross-bars of frame I for that purpose, is hung loosely a disk, G, having pins projecting horizontally from its front, on which the bobbins $d$ are placed, as shown in Figs. 1 and 2, the number of bobbins being equal to the number of threads required to form a single strand of the rope or cord to be made. A weight, $w$, is attached to each of these bobbin-holders G, to keep it from turning with the frame I, there being a thin flat piece or plate (marked $m$ in Fig. 3,) attached to the disk G and weight $w$, and extending vertically from the latter up nearly even with the center of G, as shown in Fig. 2, which is a front view of the bobbin-holder with the bobbins in place. In the upper portion of this plate $m$ a longitudinal slot is cut, as shown in Fig. 3. A small metallic arm, $i$, having a hole or eye in its upper end, is secured to plate $m$ by means of a bolt passing through the slot, so that it can be adjusted, as may be necessary, to regulate the tension upon the strand and the threads which form it. To the plate $m$, in front of the disk G and concentric therewith, is secured a smaller disk, $e$, having a series of holes through which the threads pass separately from the bobbins before entering the eye of arm $i$, as shown in Figs. 2 and 3. These parts being united and mounted, as shown in Fig. 1, a spur-wheel, B, is secured rigidly to the support or post J in such a manner as to remain stationary. Attached to the end of the main frame A concentric with this wheel B, is secured another wheel, E, somewhat smaller in diameter.

To the cross-head at the end of the main frame is secured a rectangular frame, K, as shown in elevation in Fig. 6, and in plan in Fig. 5. Within this frame K is mounted two other wheels, C and D, both secured to one shaft and revolving together. This frame K is mounted in such a position as to bring the outer wheel, C, into gear with the stationary wheel B, the inner wheel, D, gearing into the wheel E attached to the inner frame, I'.

By turning the crank L, which is attached to the journal of the main frame A, the latter is made to revolve in one direction, carrying the frame K and the wheels C and D around with it. The planet-wheel C, as it revolves around the stationary wheel B, is caused to rotate, and C being secured rigidly to the same shaft with wheel D, the latter is, of course, compelled to rotate with it; and as wheel D gears into wheel E, the latter, with the frame I', to which it is rigidly attached, is caused to rotate in a direction opposite to the main frame A, the frames I and I' twisting the separate threads into a strand, each strand receiving two twists or turns at each revolution of the frames I in consequence of its being passed through the hollow journals at each end of said frame and out around the frame, as clearly shown in Fig. 1. The strands are then laid or twisted together by the rotation of the main frame A.

Upon each of the hollow journals $n$, at the opposite end of each of the frames I and I', is secured a pinion, $o$, which gears into a long pinion-wheel, $t$, which is attached by proper journals to the arms $s$ secured to the two adjoining cross-heads of the main frame, as shown in Fig. 1. This pinion $t$ being attached thus to the main frame A, revolves with it around the pinion or wheel $o$. On the adjoining end of the next frame I is secured another wheel $o$, of the same diameter, and into this the pinion $t$ also gears, by which means the motion imparted by the first wheel $o$ to pinion $t$ is, in turn, imparted from pinion $t$ to the next wheel $o$ and the frame I, to which it is secured, and thus the frames I and I' are both moved at equal velocities and in the same direction. Each of the frames I, whatever may be their number, is geared to the next adjoining one in the same manner, whereby all are moved simultaneously in the same direction and at the same velocity.

At the opposite end of the main frame A a hollow journal is provided and extends out beyond its bearing, as shown in Fig. 1, and upon this extended portion is cut a right and left hand screw, R. On opposite sides of this screw are arranged two vertical rollers or drums, T, having pinions secured to their upper ends, so arranged that one gears into the right and the other into the left hand screw, as shown, whereby both are made to revolve at uniform speed in the same direction, as indicated by the arrows. A short distance beyond these rollers T is placed a grooved pulley, P, so located that its periphery shall come directly in line with the center of the hollow journal of the main frame A, as shown in Fig. 1. The rollers T have grooves turned in their surfaces, so that when the rope is wound around them as it comes from the machine, and as shown in Fig. 1, the various coils are kept separate and not permitted to rub or wear upon one another. The rope being wound several times around the rollers T, finally passes between the roller about which it is last wound and a grooved pulley, $u$, mounted on a vertical journal in such a position as to press snugly against the rope and prevent it from slipping. By this means the rope is drawn out of the machine as fast as formed.

The operation is as follows: The frames I being supplied with the requisite number of bobbins filled with yarn, the threads are passed through the holes in guide $e$, when they are brought together and passed through the eye of arm $i$, thence through the hollow journal of frame I, and from thence, as shown in Fig. 1, the threads from each set of bobbins forming one strand, and the three strands thus formed being brought together and twisted as they pass, finally, through the hollow journal at the rear end of the main frame A, thus completing the rope at one operation. The main frame and the frames I both revolving at the same time, and each giving a twist to the strands, it follows that each strand receives two twists at each revolution of the main frame.

If it be desired to give more or less twist to the strands before uniting them to form the rope, it is obvious that it may be done by simply changing the gearing which transmits the motion to the frames I and I'. The twist of the rope itself may be regulated as desired by using larger or smaller rollers, T, or by changing the gearing of rollers T so as to make them draw out the rope slower or faster, as may be desired. By these means the twist of the rope may be regulated as desired.

The tension of each strand can be regulated as desired by adjusting the arm $i$ to or from the guide $e$; and, if desired to lay the strands more evenly, a conical plug having three grooves formed in its sides equidistant may be inserted in the inner end of the hollow journal, and the strands made to pass separately through the grooves and uniting at its point inside of the hollow journal.

Having thus fully described my invention, what I claim as new, and desire to secure by Letters Patent, is—

1. The stationary reel or bobbin-holder G, provided with the slotted plate $m$, and adjustable arm $i$, mounted upon the hollow journals within the revolving frame I, as shown and described.

2. In combination with the stationary reel G, the main frame A, and the inner frames, I, arranged to revolve in opposite directions, substantially as set forth.

3. The combination and arrangement of the operating-wheels B, C, D, and E, main frame A, inner frames, I, and reels G, operating in connection, as described.

4. In combination with the main frame A, the right and left handed screw R, arranged to operate in connection with the wheels T, as shown and described.

JOHN BLACKIE.

Witnesses:
W. C. DODGE,
P. TELL DODGE.